(12) United States Patent
Morimoto

(10) Patent No.: US 7,925,149 B2
(45) Date of Patent: Apr. 12, 2011

(54) PHOTOGRAPHING APPARATUS AND METHOD FOR FAST PHOTOGRAPHING CAPABILITY

(75) Inventor: Yasuhiro Morimoto, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 11/823,617

(22) Filed: Jun. 28, 2007

(65) Prior Publication Data
US 2008/0008465 A1    Jan. 10, 2008

(30) Foreign Application Priority Data

Jul. 4, 2006    (JP) .................................. 2006-184570

(51) Int. Cl.
*G03B 3/00*    (2006.01)
*G03B 13/00*    (2006.01)

(52) U.S. Cl. ............ 396/127; 396/80; 396/89; 396/125; 348/353; 348/356

(58) Field of Classification Search .................... 396/127
See application file for complete search history.

(56) References Cited

U.S. PATENT DOCUMENTS

| 5,508,506 | A | * | 4/1996 | Kusaka | ........................ | 250/201.8 |
| 5,534,688 | A | * | 7/1996 | Kusaka | ........................ | 250/201.8 |
| 5,668,597 | A | | 9/1997 | Parulski et al. | | |
| 6,763,187 | B2 | | 7/2004 | Shiraishi | | |
| 7,319,488 | B2 | * | 1/2008 | Sagiya | ........................ | 348/362 |
| 7,586,535 | B2 | * | 9/2009 | Ito | .................................. | 348/347 |
| 2004/0239790 | A1 | * | 12/2004 | Maeda et al. | ................. | 348/311 |
| 2005/0168621 | A1 | * | 8/2005 | Kageyama et al. | .......... | 348/349 |
| 2006/0181634 | A1 | * | 8/2006 | Onozawa | ..................... | 348/345 |
| 2007/0052835 | A1 | * | 3/2007 | Onozawa | ..................... | 348/345 |
| 2007/0052837 | A1 | * | 3/2007 | Onozawa | ..................... | 348/345 |

FOREIGN PATENT DOCUMENTS

JP    2003-274267 A    9/2003

* cited by examiner

*Primary Examiner* — W. B. Perkey
*Assistant Examiner* — Bret Adams
(74) *Attorney, Agent, or Firm* — Drinker Biddle & Reath LLP

(57) ABSTRACT

A photographing apparatus includes a drive portion driving a focus lens included in a photographing optical system in a focus adjustment direction when a shutter button is pressed, a photographing portion continuously and sequentially outputting images of an object formed on an image forming surface through the photographing optical system as the shutter button is pressed once, as image data corresponding to the number of all pixels, an in-focus position detection portion detecting an in-focus position of the focus lens based on the image data sequentially output from the photographing portion, an in-focus control portion maintaining the focus lens at the in-focus position by controlling the drive portion based on a result of the detection by the in-focus position detecting portion, and a recording portion sequentially recording the image data output from the photographing portion during which the focus lens is maintained at the in-focus position after the shutter button is pressed.

9 Claims, 7 Drawing Sheets

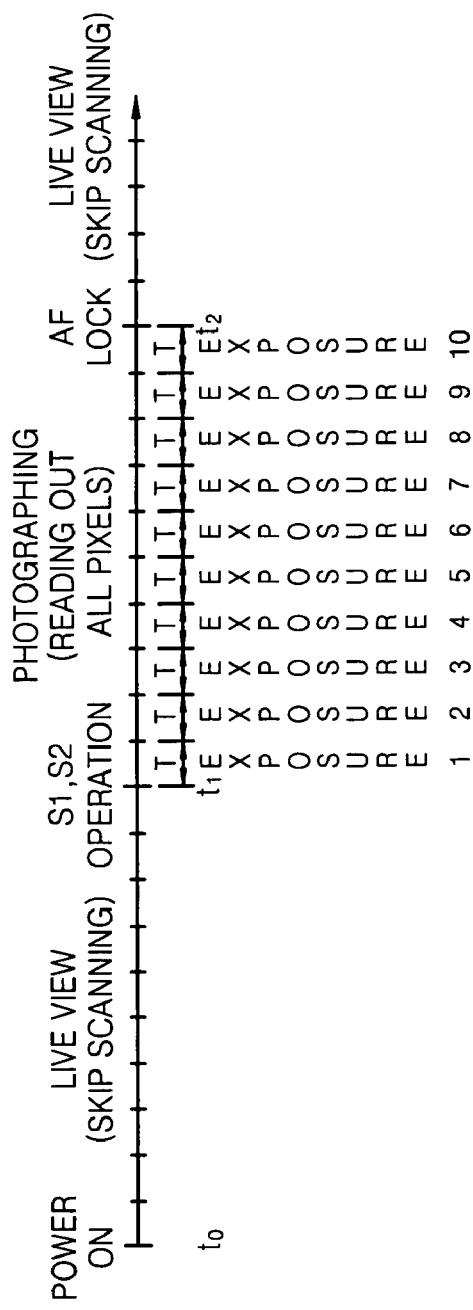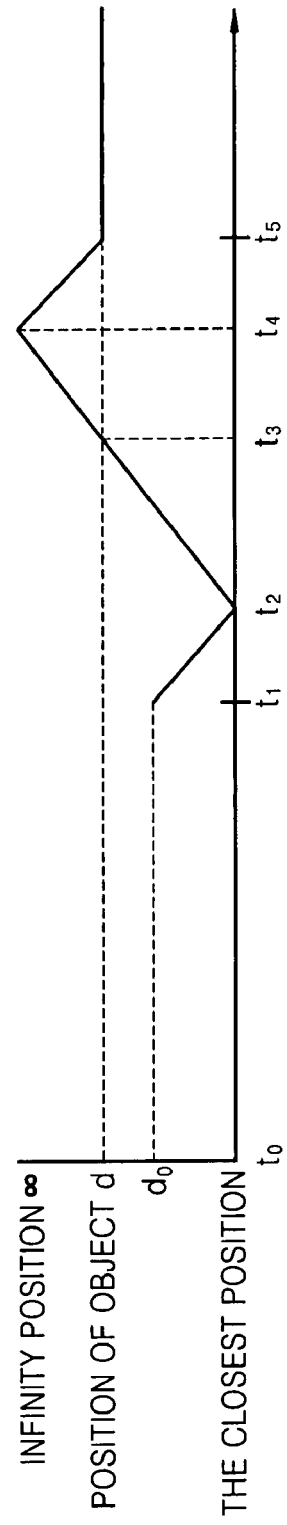

PHOTOGRAPHING APPARATUS AND METHOD FOR FAST PHOTOGRAPHING CAPABILITY

CROSS-REFERENCE TO RELATED PATENT APPLICATIONS

This application claims the benefit of Japanese Patent Application No. 2006-184570, filed on Jul. 4, 2006, in the Japanese Intellectual Property Office, the disclosure of which is incorporated herein in its entirety by reference.

BACKGROUND OF THE INVENTION

1. Field of the Invention

The present invention relates to a photographing apparatus and method, and more particularly, to a photographing apparatus which performs photographing while auto-focusing and has a superior fast photographing capability (a snapshot function).

2. Description of the Related Art

In a conventional photographing apparatus such as a digital camera, an auto-focusing (AF) operation is initiated when the shutter button is half pressed and then photographing is performed by fully pressing the shutter button. In such an apparatus, photographing is not allowed until the AF operation is complete. As a result, fast photographing is not possible because it would require photographing when the AF operation is not yet complete.

According to Japanese Patent Laid-Open No. 2003-274267, in an AF photographing mode, photographing is not allowed when an in-focus operation is performed so that fast photographing is impossible. Also, although a shutter change may be obtained in a fixed focus photographing mode, since photographing is made with a fixed focus, it is not possible to obtain a clear image.

SUMMARY OF THE INVENTION

The present invention provides a photographing apparatus which performs photographing while performing auto-focusing and has a superior fast photographing capability, i.e., a snapshot function, and a photographing method therefor.

According to an aspect of the present invention, a photographing apparatus comprises a drive portion driving a focus lens included in a photographing optical system in a focus adjustment direction when a shutter button is pressed, a photographing portion continuously and sequentially outputting images of an object formed on an image forming surface through the photographing optical system as the shutter button is pressed once, as image data corresponding to the number of all pixels, an in-focus position detection portion detecting an in-focus position of the focus lens based on the image data sequentially output from the photographing portion, an in-focus control portion maintaining the focus lens at the in-focus position by controlling the drive portion based on a result of the detection by the in-focus position detecting portion, and a recording portion sequentially recording the image data output from the photographing portion during which the focus lens is maintained at the in-focus position after the shutter button is pressed.

According to the above structure, by pressing the shutter button one time, the images of an object formed on the image forming surface are sequentially and continuously output from the image data as much as the number of all pixels through the photographing optical system. Each image data output from the photographing portion are sequentially recorded during which the focus lens is maintained at the in-focus position after the shutter button is pressed. Since the image data corresponding to all pixels is output and recorded while the focus lens is driven to the in-focus position, a focused image can be photographed more quickly after the shutter button is pressed.

An image of the object photographed again and inserted after the focus lens is maintained at the in-focus position by the in-focus control portion is output as image data corresponding to the number of all pixels. Thus, an image corresponding to the focused all pixels can be photographed when the position of the focus lens is fixed.

The photographing apparatus further comprises a switching portion selectively switching an output mode of the photographing portion between a first mode in which an image of the object is output as image data corresponding to the number of all pixels and a second mode in which the image of the object is output as image data corresponding to the number of pixels obtained by deducting a predetermined number from all pixels, a detection portion detecting a state of pressing the shutter button in two steps, and a determination portion determining whether the time interval between when the shutter button is pressed to a first step and when the shutter button is pressed to a second step is within a predetermined time. When the time interval is within the predetermined time, when the shutter button reaches the second step the second mode is switched to the first mode and simultaneously the drive portion and the photographing portion respectively initiate processing operations, and the photographing portion outputs the image of the object photographed again and inserted after the focus lens is maintained at the in-focus position, as image data corresponding to the number of all pixels. Thus, when the shutter button is pressed quickly, the focus lens is driven to the in-focus position and image data is continuously and sequentially gathered from the time the shutter button reaches the second step until the focus lens finally reaches the in-focus position, so that the image data of all pixels is output and recorded corresponding to the image data obtained when the focus lens was at the focus position during the auto-focusing operation.

The photographing apparatus further comprises a switching portion selectively switching an output mode of the photographing portion between a first mode in which an image of the object is output as image data corresponding to the number of all pixels and a second mode in which the image of the object is output as image data of less than all pixels, a detection portion detecting a state of pressing the shutter button in two steps forming a single press operation, and a determination portion determining whether the time interval between when the shutter button is pressed to a first step and when the shutter button is pressed to a second step is within a predetermined time. When the time interval exceeds the predetermined time, the drive portion and the photographing portion maintained in the second mode respectively continue process operations until the focus lens is maintained at the in-focus position regardless of whether the shutter button reaches the second step pressing state, and, when the focus lens is maintained at the in-focus position and the shutter button reaches the second step, the switching portion switches the second mode to the first mode and simultaneously the photographing portion outputs the image of the object as image data corresponding to the number of all pixels. Thus, when the shutter button is not pressed quickly, the image data is output at high speed in the second mode to detect the in-focus position, the focus lens is maintained at the in-focus position, and the image data corresponding to the number of all pixels can be output and recorded from the time when the shutter button reaches the second step.

When the focus lens is maintained at the in-focus position and the shutter button is in the second step pressing state, the switching portion maintains the first mode and the photographing portion outputs the image of the object as image data corresponding to the number of all pixels. Thus, after the focus lens is maintained at the in-focus position, the image data corresponding to the number of all pixels can be output.

The in-focus position detection portion obtains an evaluation value according to a contrast component of the image of the object based on the image data sequentially output from the photographing portion, and the in-focus control portion records only the image data corresponding to an evaluation value over a predetermined reference among the evaluation values obtained for each image data or only the image data corresponding to an evaluation value of the predetermined number of upper range in the recording portion. Thus, only the image data having a high evaluation value is recorded and unnecessary image data need not be recorded.

According to another aspect of the present invention, a photographing method comprises driving a focus lens included in a photographing optical system in a focus adjustment direction when a shutter button is pressed and continuously and sequentially outputting images of an object formed on an image forming surface through the photographing optical system as the shutter button is pressed once, as image data corresponding to the number of all pixels, detecting an in-focus position of the focus lens based on the sequentially output image data, driving the focus lens to be maintained at the in-focus position based on a result of the detection, and sequentially recording the image data output from the photographing portion when the focus lens was at maintained at the in-focus position. Thus, after the shutter button is pressed, the focused image is photographed more quickly.

In the driving of the focus lens included in a photographing optical system in a focus adjustment direction, after the focus lens is maintained at the in-focus position based on a result of the detection, the image of the object is photographed again and inserted after the focus lens is maintained at the in-focus position is output as image data corresponding to the number of all pixels. Thus, a focused image corresponding to the number of all pixels can be photographed when the position of the focus lens is fixed.

In the detecting of the in-focus position of the focus lens based on the sequentially output image data, an evaluation value according to a contrast component of the image of the object is obtained based on the image data sequentially output in the driving of the focus lens included in a photographing optical system in a focus adjustment direction, and, when sequentially recording of the image data output from the photographing portion during which the focus lens is maintained at the in-focus position after the shutter button is pressed, only the image data corresponding to an evaluation value over a predetermined reference among the evaluation values obtained for each image data or only the image data corresponding to an evaluation value of the predetermined number of upper range is recorded in the recording portion. Thus, only the image data having a high evaluation value is recorded and unnecessary image data need not be recorded.

BRIEF DESCRIPTION OF THE DRAWINGS

The above and other features and advantages of the present invention will become more apparent by describing in detail preferred embodiments thereof with reference to the attached drawings in which:

FIGS. 3A, 3B, 3C, and 3D are timing charts showing when photographing is performed in a snapshot mode (a fast photographing mode);

DETAILED DESCRIPTION OF THE INVENTION

Figure 1:
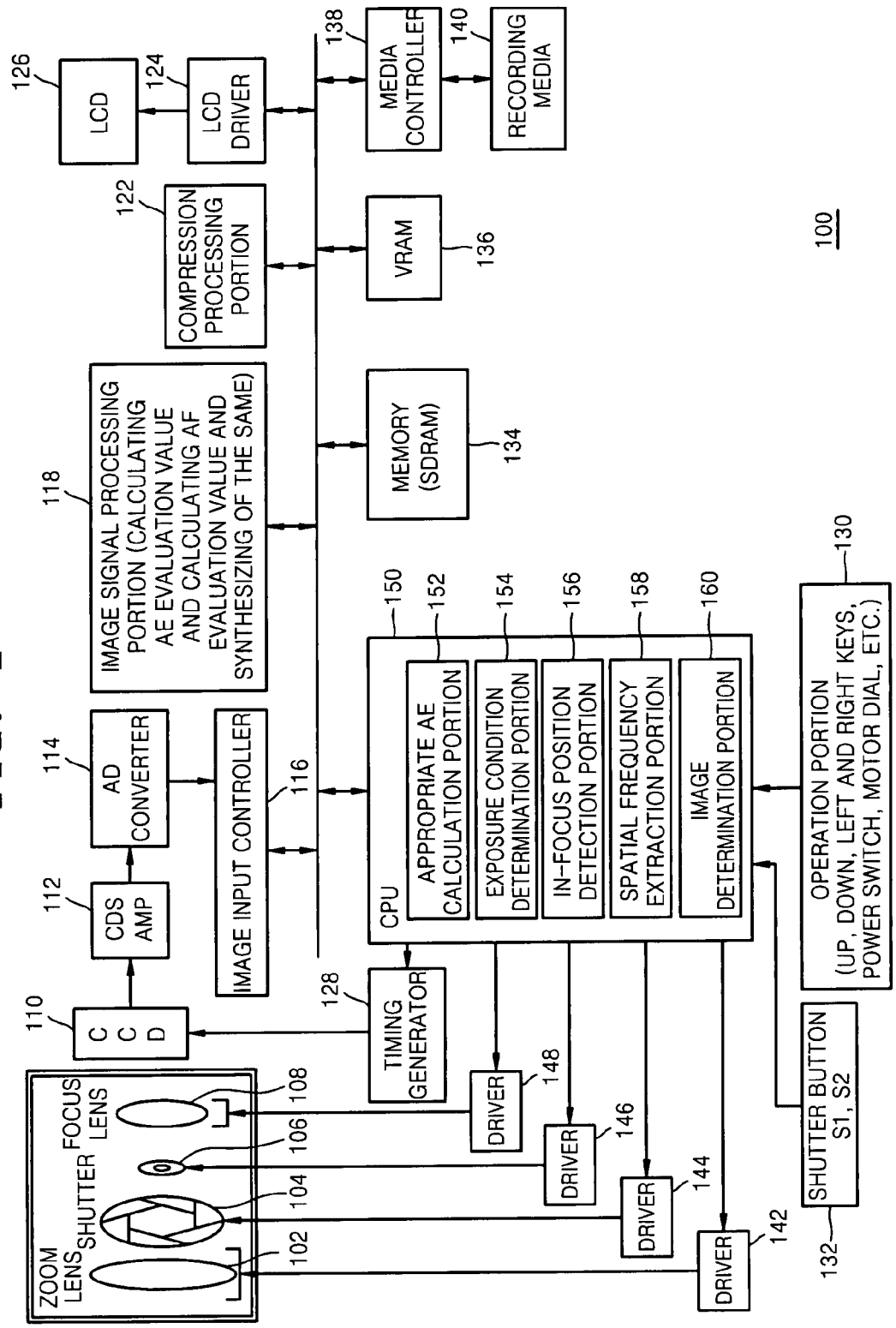
FIG. 1 is a block diagram showing the configuration of a photographing apparatus according to an embodiment of the present invention.

The attached drawings for illustrating preferred embodiments of the present invention are referred to in order to explain the present invention, the merits thereof, and the objectives accomplished by the implementation of the present invention. Hereinafter, the present invention will be described in detail by reference to preferred embodiments of the invention in conjunction with the attached drawings. Like reference numerals in the drawings denote like elements.

FIG. 1 is a block diagram showing the configuration of a photographing apparatus 100 according to an embodiment of the present invention. Referring to FIG. 1, the photographing apparatus 100 includes a zoom lens (group) 102, a shutter 104, an aperture 106, a focus lens (group) 108, a charge coupled device (CCD) 110 as a photographing device, an amplifier-incorporated correlated double sampling (CDS) circuit 112, an A/D converter 114, an image input controller 116, an image signal processing portion 118, an image synthesizing portion (not shown), a compression processing portion 122, a liquid crystal display (LCD) driver 124, an LCD 126, a timing generator 128, a central processing unit (CPU) 150, an operation portion 130, a shutter button 132, a memory 134, a video random access memory (VRAM) 136, a media controller 138, a recording medium 140, and drivers 142, 144, 146, and 148.

The zoom lens 102, the shutter 104, the aperture 106, and the focus lens 108 are driven by an actuator (not shown) that is controlled by the drivers 142, 144, 146, and 148. The zoom lens 102 moves back and forth along an optical axis and continuously changes focal length. The shutter 104 controls exposure time of the CCD device 110 when an image is photographed. The aperture 106 controls the amount of light incident on the CCD device 110 when an image is photographed. The focus lens 108 moves back and forth along the optical axis and controls the focus of an image of an object formed on the CCD device 110.

The CCD device 110 converts incident light through the zoom lens 102, the shutter 104, the aperture 106, and the focus lens 108 to an analog electric signal. A photographing portion according to the present embodiment includes the CCD portion 110 and the shutter 104.

In the present embodiment, the CCD device 110 is used as a photographing portion, but the present invention is not limited thereto. A CMOS (complementary metal oxide semiconductor) device or other image sensor can be used instead of the CCD device 110. Since the CMOS device can convert an image light of an object to an electric signal at a faster speed than the CCD device 110, the time from the photographing of an object to the synthesizing of an image can be reduced.

The CDS AMP circuit 112 is a circuit incorporating a CDS circuit that samples and removes noise for the signal output from the CCD device 110 and an amplifier that amplifies the signal after the noise is removed. Although the circuit incorporating the CDS circuit and the amplifier is used in the present embodiment, the CDS circuit and the amplifier can be configured as separated circuits.

The A/D converter 114 converts the analog signal generated by the CCD device 110 to a digital signal, generating the raw data (image data) of the image. The image input controller 116 controls the input of the generated raw data (image data) of the image to the memory 134.

The image signal processing portion 118 produces an AF evaluation value as contrast information from the image data output from the CCD device 110. Also, the image signal processing portion 118 performs correction of gain in the amount of light, process of edge of an image, and adjustment of white balance.

The image synthesizing portion synthesizes a plurality of photographed images. The image synthesizing portion can be a circuit for synthesizing images or a computer program for synthesizing images.

The compression processing portion 122 compresses the image synthesized by image synthesizing portion into image data in an appropriate format. The compression format can be either a lossless format or lossy format. For example, the image data can be compressed into a JPEG (joint photographic experts group) format or a JPEG2000 format.

The LCD 126 displays a live view before performing a photographing operation, various settings of the photographing apparatus 100, and photographed images. The display of image data or various information of the photographing apparatus 100 is performed by the LCD driver 124.

The timing generator 128 inputs a timing signal to the CCD device 110. That is, the driving of the CCD device 110 is controlled by the timing signal from the timing generator 128. The timing generator 128 controls switching of a mode to read out data from the CCD device 110 between a drive mode 1 and a drive mode 2. In the drive mode 1, image data is read out from all pixels of the CCD 110. In the drive mode 2, the image data is read out from some of the pixels by performing skip scanning for every predetermined number of rows or columns among all pixels of the CCD device 110. The timing generator 128 can perform an electronic shutter function in the CCD device 110 by inputting image light from an object within a time during which the CCD device 110 is driven.

Figure 2A:
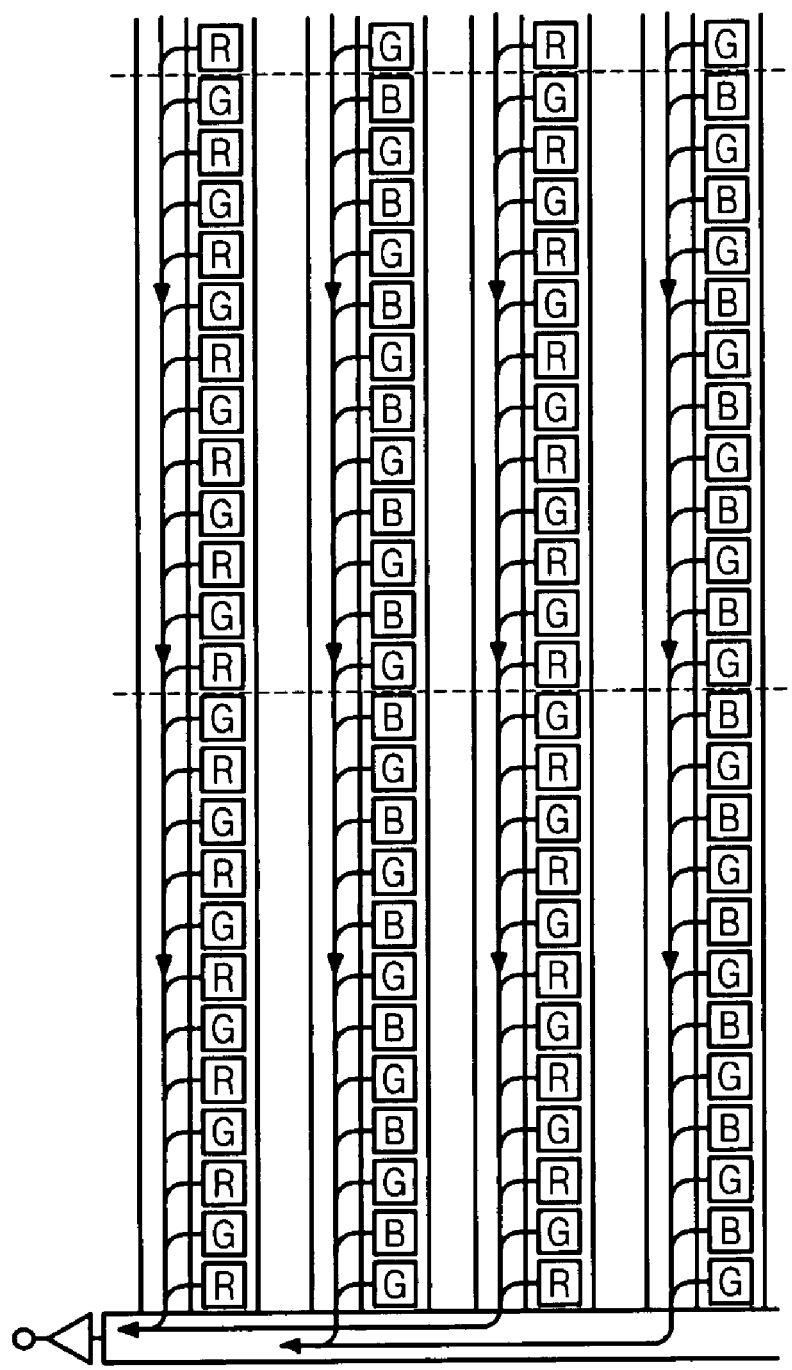
FIG. 2A illustrates a state of reading image data from each of pixels of a CCD device in a drive mode 1.
Figure 2B:
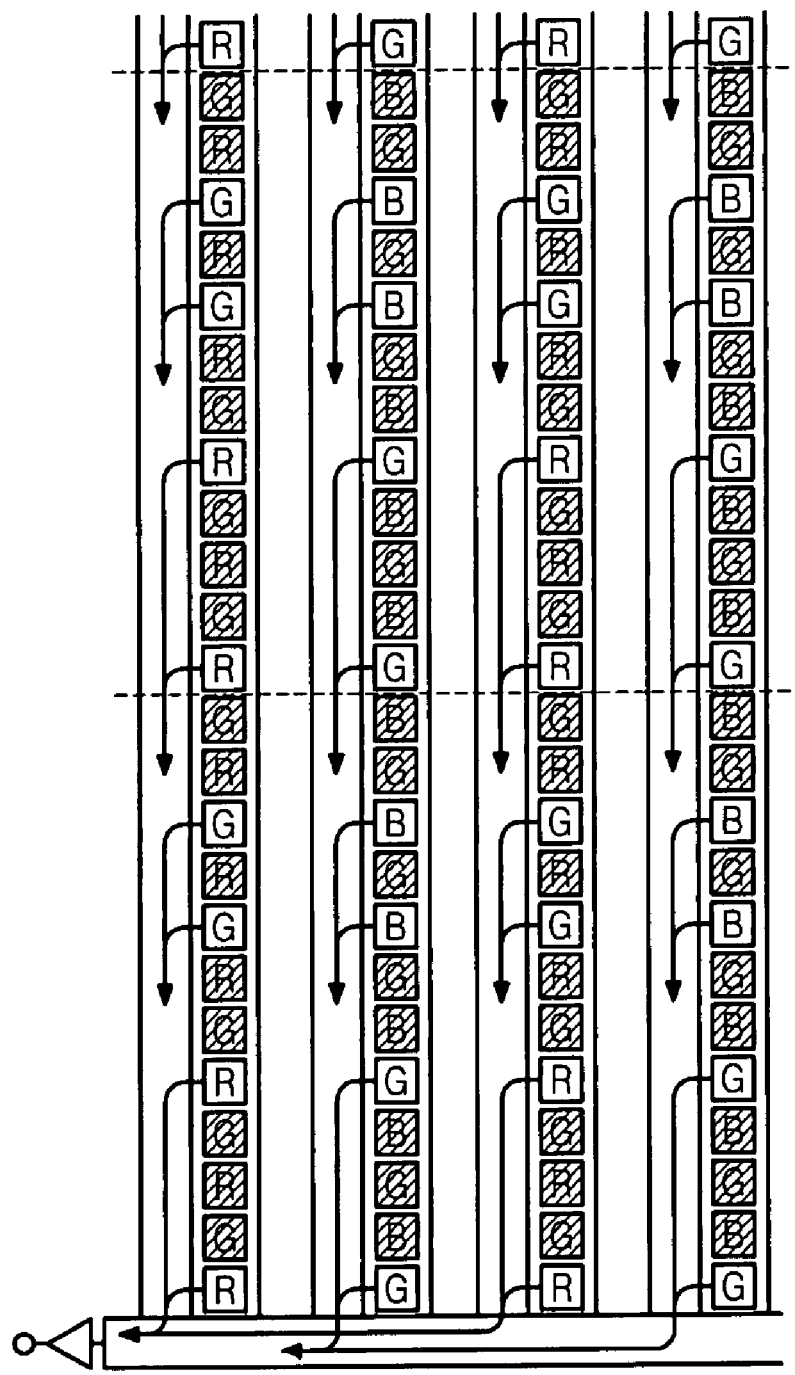
FIG. 2B illustrates a state of reading image data from each of pixels of a CCD device in a drive mode 2.

Turning for a moment to FIGS. 2A and 2B, there is illustrated two different modes of reading image data from the pixels of the CCD device. In particular, FIG. 2A illustrates a state of reading image data from the pixels of the CCD device in drive mode 1. FIG. 2B illustrates a skip scanning mode of reading image data from less than all the pixels of the CCD device in the drive mode 2. Referring to FIG. 2A, in the drive mode 1, image data is read from all of the pixels 111 arranged in a matrix format. In the drive mode 2, illustrated in FIG. 2A, skip scanning is performed and only predetermined rows among the pixels 111 of the CCD device 110 are read so that the image data is partially read. That is, in FIG. 2B, the image data is not read from the hatched pixels. Thus, in the drive mode 2, image data corresponding to less than all the pixels is read.

Turning back to FIG. 1, the CPU 150 performs a command of a signal system to the CDS circuit 112 or a command of an operation system according to the operation of the operation portion 130. In the present embodiment, one CPU is provided and the commands of the signal system and the operation system are performed by the CPU 150.

The operation portion 130 performs the operation of the photographing apparatus 100. A plurality of members for performing various setting for photographing are arranged in the operation portion 130. The members of the operation portion 130 includes a power button, a cross button for selecting a photographing mode or a photographing drive mode and setting effect parameters, and a selection button. The shutter button 132 is for the operation of photographing. When the shutter button 132 is half pressed (hereinafter, referred to as the S1 operation), the AF operation is performed, driving the focus lens 108 to an in-focus position. When the shutter button 132 is completely pressed (hereinafter, referred to as the S2 operation), the CCD device 110 is exposed to the light so that an object is photographed.

The memory 134 temporarily stores the photographed image or the image synthesized by the image synthesizing portion. The memory 134 has a memory capacity sufficient to store a plurality of images. The writing and reading of image data in the memory 134 is controlled by the image input controller 116.

The VRAM 136 maintains the content displayed on the LCD 126 and the resolution or the maximum number of colors of the LCD 126 depends on the capacity of the VRAM 136.

The recording medium 140 records the photographed image or the image synthesized by the image synthesizing portion. The input/output of the recording medium 140 is controlled by a media controller 138. A card type memory device recording data in a flash memory can be used as the recording medium 140.

The CPU 150 includes an appropriate auto-exposure (AE) calculation portion 152, an exposure condition determination portion 154, an in-focus position detection portion 156, a spatial frequency extracting portion 158, and an image evaluation portion 160.

The appropriate AE calculation portion 152 obtains an exposure value (EV) by performing auto-exposure in the photographing apparatus 100. A combination of an appropriate aperture value and shutter speed (the time during which the shutter is open) is determined based on the obtained EV. When the aperture value is set to F1 and shutter speed is set to one second, the EV to obtain an appropriate exposure is 0. The EV is changed by changing the aperture value or shutter speed. The EV can be obtained from the equation $EV=\log_2(F^2/T)$ where "F" is the aperture value and "T" is the shutter speed. Thus, with the same aperture value, as the shutter speed increases, the EV increases. With the same shutter speed, as the aperture value increases, the EV increases. The appropriate AE calculation portion 152 calculates the AE evaluation value of the photographed image. Also, the AE evaluation value can be calculated by the image signal processing portion 118.

The exposure condition determination portion 154 determines the aperture value and shutter speed when an object is photographed, based on the AE evaluation value calculated by the appropriate AE calculation portion 152. The drivers 144 and 146 are controlled based on the determined aperture value and shutter speed.

The in-focus position detection portion 156 detects the in-focus position of the object from the AF evaluation value of the image data generated by the image signal processing portion 118 when the image light is incident on the CCD device 110 from the object. An in-focus position detection portion according to the present invention includes an actuator driving the in-focus position detection portion 156, the driver 148, and the focus lens 108.

The spatial frequency extracting portion 158 extracts a spatial frequency (a contrast value) of the photographed image. The image evaluation portion 160 determines the quality of the photographed image based on the value extracted by the comparison area setting portion 158 and provides the image data with information on image quality. Also, the contrast information extracted by the comparison area setting portion 158 can be used as the AF evaluation value.

Figure 3C:
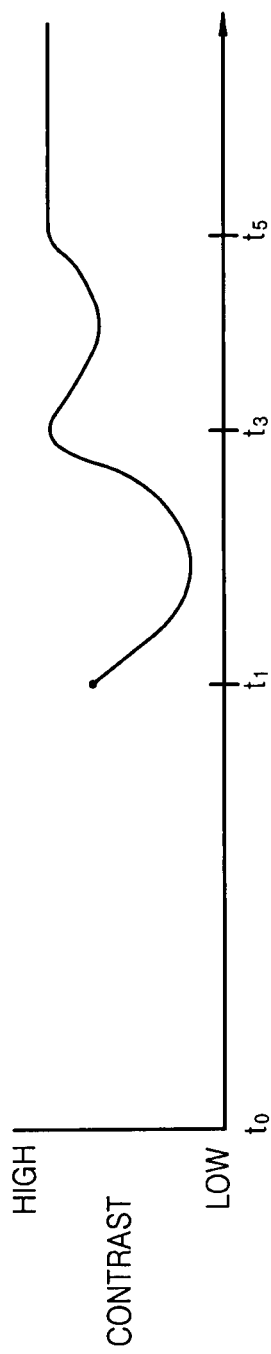
Figure 3D:
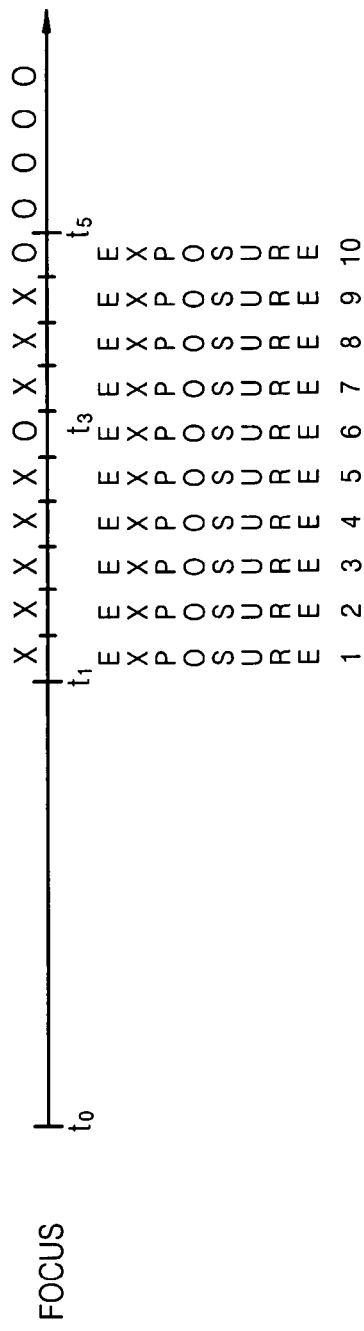

FIGS. 3A, 3B, 3C, and 3D are timing charts showing a photographing operation performed in a snapshot mode. FIG. 3A shows the operation of the photographing apparatus 100 and the read mode of the CCD device 110. FIG. 3B shows the position of the focus lens 108 corresponding to the distance of an object. FIG. 3C shows the contrast of a photographed image. FIG. 3D shows the state of the focus of the photographed image. In FIG. 3D, a mark "O" indicates that the focus of the photographed image is clear while a mark "X" indicates that the focus of the photographed image is not clear.

As shown in FIG. 3A, the power of the photographing apparatus 100 is turned on at the time $t_0$. When the power is turned on, a live view is displayed on the LCD 126. When the live view is displayed, the CCD device 110 is driven in the drive mode 2. Thus, since reading the image of one frame read at a constant interval, for example, $1/30^{th}$ of a second, can be performed at high speed when skip scanning in drive mode 2, the live view is displayed in real time.

As shown in FIG. 3A, when the S1 and S2 operations are performed almost at the same time at the time $t_1$, the apparatus knows that the shutter button was pressed quickly and therefore fast photographing in a snap mode according to the present embodiment is performed. When the S1 and S2 operations are performed at a predetermined interval, an AF operation is performed in a normal mode. In the normal mode, while the focus lens 108 is driven with a constant driving amount after the S1 operation, in the drive mode 1, image data is read from the CCD device 110 and the AF evaluation values (contrast values) of the read images are sequentially calculated. The position of the focus lens 108 corresponds to each of the AF evaluation values. The state in which the AF evaluation value is the highest is the in-focus state which is a position where the focus lens 108 is finally driven. After the focus lens 108 is driven to the in-focus position, photographing by the S2 operation is performed.

In the fast photographing or snapshot mode, the AF operation and the photographing are performed in parallel as described below.

When the S1 and S2 operations are performed almost at the same time at the time $t_1$, the AF operation is initiated and the focus lens 108 is driven. As shown in FIG. 3B, assuming that the focus lens 108 is located at a position corresponding to an object distance do at the time $t_1$, the focus lens 108 is driven to be located at a position corresponding to the closest position at a time $t_2$. Thereafter, the focus lens 108 is driven to a position corresponding to an infinity (∞) position at a time $t_4$.

When the focus lens 108 is driven from the closest position to the infinity position, the position of the focus lens 108 where the AF evaluation value reaches its peak value is detected. Thus, after the time $t_4$, the focus lens 108 is driven to the position where the contrast value reaches its peak value at a time $t_5$ which is an in-focus position.

After the time $t_1$, photographing is performed together with the AF operation. During the photographing, image data is read from all pixels of the CCD device 110 as data of the photographed image. That is, when the photographing in a snapshot mode is initiated at the time $t_1$, the read mode of the CCD device 110 is set to the drive mode 1. Thus, a high quality image can be photographed and simultaneously the AF operation is performed based on the data of the photographed image.

In particular, for example, when the CMOS device is used as the photographing device, post processing after exposure can be performed at high speed. Thus, even when the photographing device is controlled in the drive mode 1, the AF operation can be performed without any delay.

During the photographing, a plurality of exposures is continuously performed at a predetermined time interval T. For example, ten times of exposure are continuously performed at a shutter speed of 1/20 seconds for each exposure. Whenever each exposure is performed, data from the CCD device 110 is read and retained.

Since the object is located between the closest position and the infinity position, the focus lens 108 passes the in-focus position at least once when moving from the closest position to the infinity position. Thus, the image of the object that is in focus can be photographed by continuously performing exposure when the focus lens 108 is driven from the closest position to the infinity position.

As shown in FIG. 3C, in the process of driving the focus lens 108 from the closest position to the infinity position, the contrast value of the image data reaches its peak at the time $t_3$ where the focus lens 108 is driven to the position corresponding to the object distance d and the time $t_3$ where the focus lens 108 is finally driven to the in-focus position. Thus, the image photographed at the time $t_3$, that is, the image by the $6^{th}$ exposure, and the image photographed at the time $t_5$, that is, the image by the $10^{th}$ exposure, are the in-focus image which is a focused clear image as shown in FIG. 3D.

The photographed images are stored on the recording media 140 with information about the image quality given by the image evaluation portion 160. A user can select the highest quality image that is well focused and clear based on the image quality from the images stored on the recording medium 140. Also, the photographed images can be displayed on the LCD 126 for the user to select the highest quality image while viewing the images. Alternatively, the photographing apparatus 100 can select the highest quality image based on image the quality information.

As a result, since the in-focus image can be photographed in the middle of the AF operation, a release time delay can be reduced compared to the photographing in a normal mode where the photographing is initiated after the AF operation is complete. Thus, when photographing in the snapshot mode, an image at a timing which was not available according to the prior art can be photographed by continuously photographing still images during the focusing process of the AF operation. Therefore, according to the invention, fast photographing can be performed more quickly, reducing the possibility that a critical photographing opportunity, especially for a fast moving object, is missed.

After the AF operation is complete at the time $t_5$ and AF locking is performed, exposure is performed once (the $11^{th}$ exposure) in a state in which the position of the focus lens 108 is fixed, so that the photographing is complete. That is, in the snapshot mode, photographing is initiated with the AF operation and, when the AF operation is complete, the photographing is complete. Then, the CCD device 110 is driven in the drive mode 2 so that the live view is performed on the LCD 126. Also, when a predetermined setting is made to continue the photographing after the time $t_5$ by the manipulation of the operation portion 130, the photographing can be continuously performed in a state in which the AF locking is performed after the time $t_5$.

In addition, in FIGS. 3A and 3B, the focus lens 108 is finally driven to the in-focus position at the time $t_5$. When the photographing is performed only in the snapshot mode, the photographing can be completed at the time $t_4$ where the focus lens 108 is driven to the position corresponding to the infinity position. This is because, in the process of driving the focus lens 108 from the position corresponding to the very close position to the position corresponding to the infinity position, since the focus lens 108 passes the in-focus position at least one time, an in-focus image can be photographed.

However, to certainly perform exposure at the in-focus position, photographing needs to be performed when the focus lens 108 is driven from the closest position to the infinity position. When the number of exposures is small, there is a possibility that the exposure is performed at a timing out of the in-focus position. The necessary number of exposures varies according to the focal length. Compared to a wide angle lens, a telescopic lens requires a large amount of driving the focus lens 108 from the closest position to the infinity position, the necessary number of exposures increases as the focal length of an image forming optical system increases. Also, when the necessary number of exposures increases, the photographing time from the time $t_1$ to the time $t_5$ in the snapshot mode extends. Likewise, when the shutter speed of one-time exposure increases, the photographing time in the snapshot mode increases as well. Thus, only when the necessary number of exposures is smaller than a predetermined value, or the shutter speed of one-time exposure is smaller than a predetermined value, for example, $1/10^{th}$ of a second, photographing in the snapshot mode can be permitted. Instead, when the shutter speed is greater than the predetermined value, the shutter speed is decreased by adjusting gain so that photographing in the snapshot mode can be permitted.

In the present embodiment, the snapshot mode is determined based on the time interval between the S1 operation and the S2 operations. For example, a user may set the snapshot mode by manipulating the operation portion 130.

Figure 4:
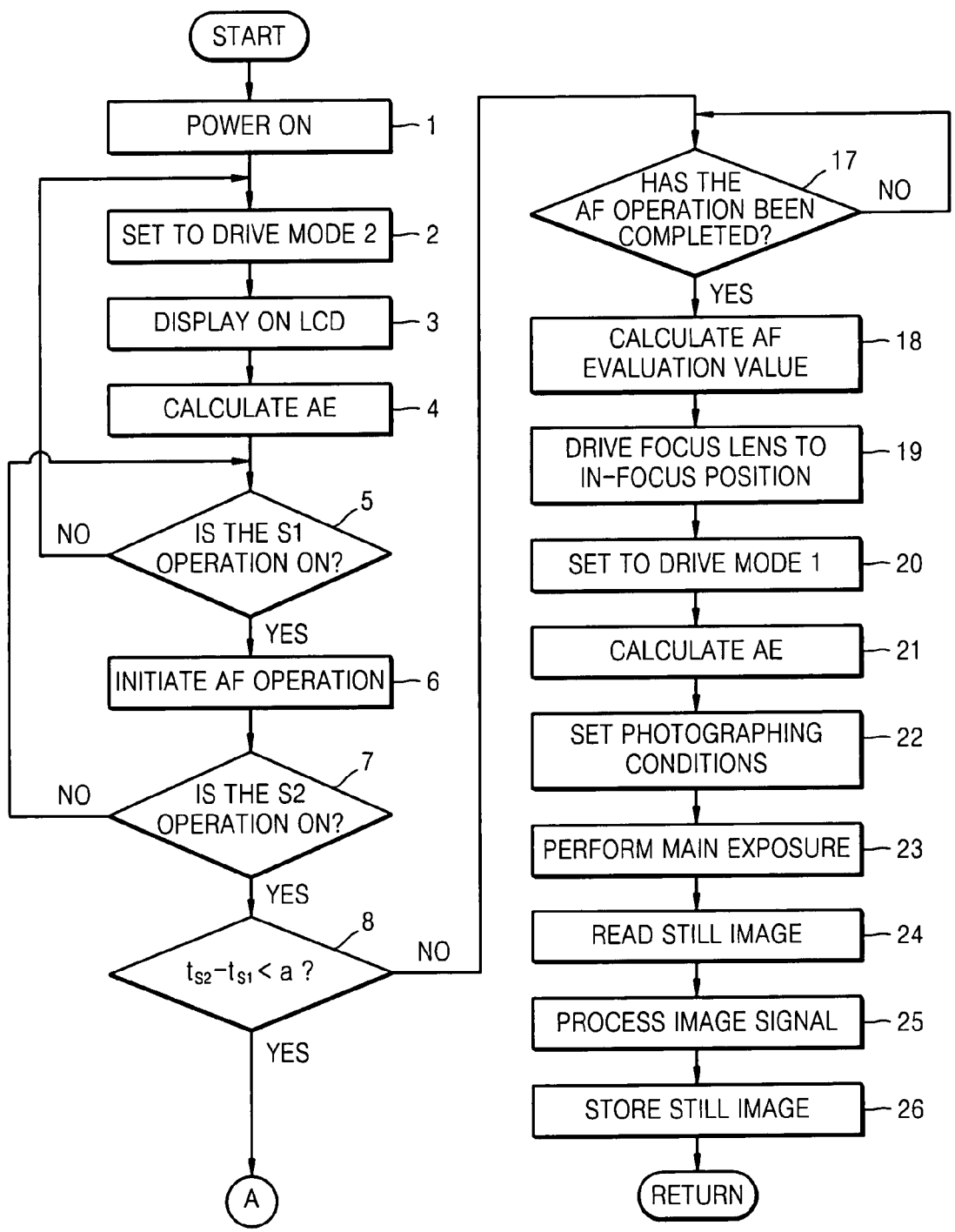
FIG. 4 is a flow chart showing the process sequence in the photographing apparatus of FIG. 1.
Figure 5:
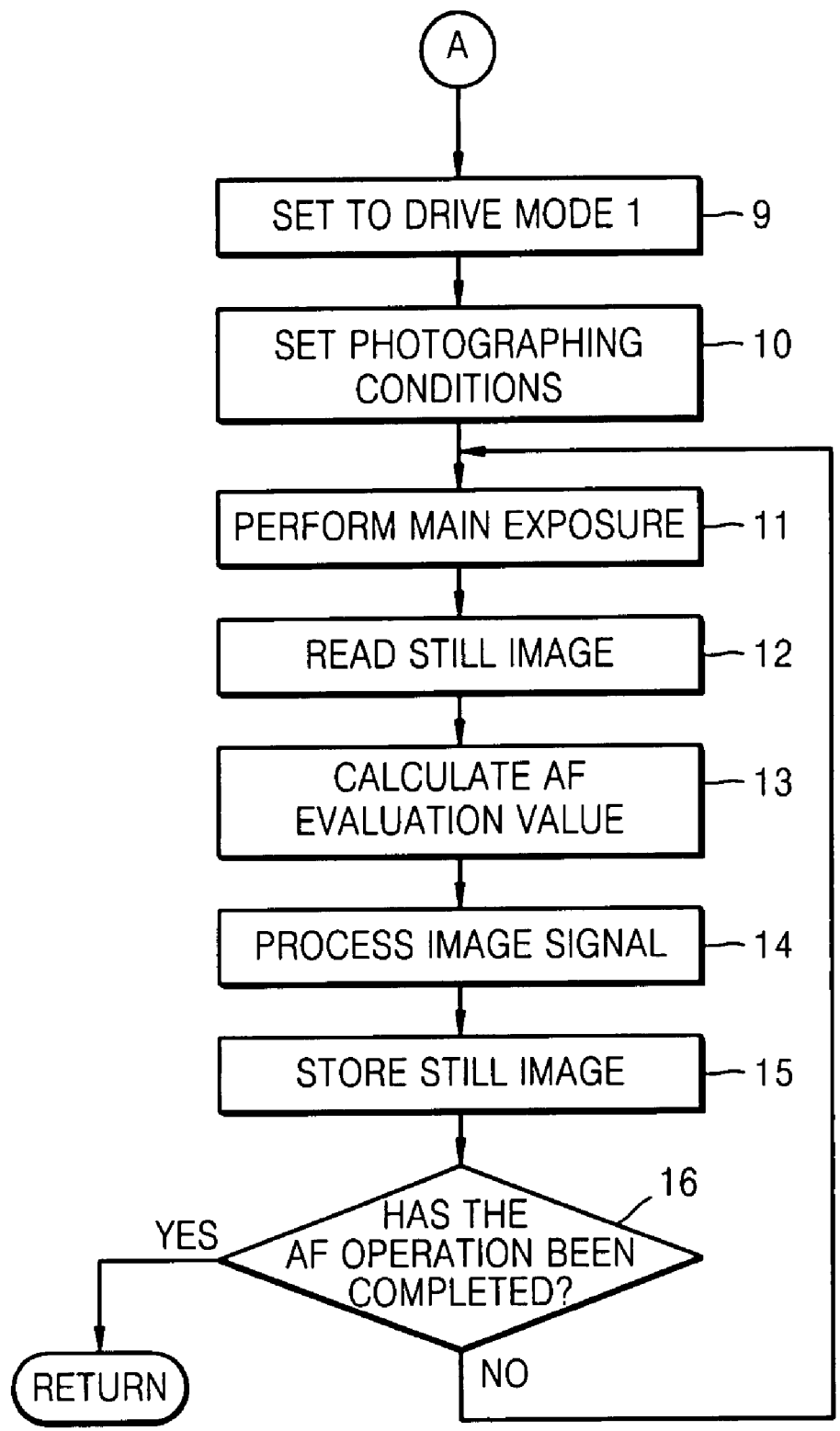
FIG. 5 is a flow chart showing a further portion of the process sequence of the photographing apparatus that branches from FIG. 4.

FIGS. 4 and 5 show a flow chart of the process sequence in the photographing apparatus 100 of FIG. 1. Referring to FIG. 4, first, in step 1, the power of the photographing apparatus 100 is turned on. When the power is turned on, the CCD device 110 is set to the drive mode 2 in step 2. Accordingly, exposure and image reading are performed at a constant interval, for example, $1/30^{th}$ of a second, by skip scanning. The obtained image is displayed in real time as a live view on the LCD 126 arranged on the rear surface of the photographing apparatus 100 in step 3.

In step 4, the brightness value of an object is calculated from the image data so that an AE operation is performed. In step 5, whether the S1 operation has been performed by a photographer is determined. When the S1 operation is performed, the process goes to step 6. Otherwise, the process goes back to the step 2.

In step 6, the AF operation is initiated so that the driving of the focus lens 108 is initiated. Then, image data corresponding to the position of the focus lens 108 is obtained. In step 7, whether the S2 operation has been performed by the photographer is determined. When the S2 operation is performed, the process goes to step 8. Otherwise, the process goes back to step 5.

Step 8 determines whether the difference between the time $t_{s1}$ when the S1 operation is performed and the time $t_{s2}$ when the S2 operation is performed is less than a predetermined short time "a", that is, $t_{s2}-t_{s1}<a$. When $t_{s2}-t_{s1}<a$, the S2 operation has been performed just after the S1 operation and it is assumed that the photographer desires to perform fast photographing in the snapshot mode. Thus, in this case, the process goes to step 9 so that the photographing in the snapshot mode is performed.

As illustrated in FIG. 5, in step 9, the CCD device 110 is set to the drive mode 1 and image data is read from all pixels. In step 10, photographing conditions such as the aperture and shutter speed are set. In step 11, main exposure (actual exposure) is performed. Next, in step 12, reading the data of the photographed image with the exposure of the step 11 is performed. In step 13, the AF evaluation value (spatial frequency) of the read image is determined. In step 14, the read image is processed. In step 15, the image is stored in the recording media 140.

In step 16, whether the AF operation is complete is determined and, when the AF operation is complete, photographing in the snapshot mode is complete and the process returns. When the AF operation is not complete, the process returns to the S11 and the main exposure is continuously performed. Thus, the exposure is continuously performed until the time $t_5$ when the AF operation is complete.

When $t_{s2}-t_{s1} \geq a$ in step 8, since it is assumed that the photographer does not desire to perform photographing in the snapshot mode, the process branches to step 17 to perform photographing in the normal mode. That is, in step 17, the AF evaluation value of the image data obtained by the AF operation initiated in the step 6 is calculated. Since the drive mode 2 is set in the step 2, in step 18, the AF evaluation value is calculated from the image data read in drive mode 2. In step 19, the focus lens 108 is driven to the in-focus position.

In step 20, the CCD device 110 is set to drive mode 1 and the image data is read from all pixels. The AE is calculated in step 21. The photographing conditions such as the aperture and shutter speed are set in step 22. The main exposure is performed in step 23. In step 24, reading the data of the image photographed with the exposure of step 23 is performed. The image processing of the read image is performed in step 25. The image is stored in step 26. After step 26, the processing of the photograph in the normal mode is complete and the process returns.

In steps 11 to 16 of FIG. 5, exposure is performed when the focus lens 108 is driven. However, it is preferable to continuously perform exposure by sporadically performing a driving of the focus lens 108 in a very narrow range and alternately performing the driving of the focus lens 108 and the exposure. According to this method, since the focus lens 108 is stopped during the exposure, a clearer image can be obtained.

As described above, according to the present invention, when the S1 operation and the S2 operation are performed almost simultaneously, since photographing is performed during the AF operation, an image can be instantly photographed. Thus, when a moving object is photographed, missing a photographing opportunity can be reduced.

What is claimed is:

1. A photographing apparatus comprising:
  a drive portion driving a focus lens included in a photographing optical system in a focus adjustment direction when a shutter button is pressed;
  a photographing portion continuously and sequentially outputting images of an object formed on an image forming surface through the photographing optical system, as either image data corresponding to the number of all pixels or image data corresponding to less than all pixels according to a press of the shutter button;
  an in-focus position detection portion detecting an in-focus position of the focus lens based on the image data sequentially output from the photographing portion;

an in-focus control portion for driving the focus lens and then maintaining the focus lens at the in-focus position by controlling the drive portion based on a result of the detection by the in-focus position detecting portion; and a recording portion sequentially recording the image data corresponding to the number of all pixels output from the photographing portion during which the focus lens is driven and maintained at the in-focus position after the shutter button is pressed.

2. The photographing apparatus of claim 1, wherein an image of the object photographed again, and after the focus lens is maintained at the in-focus position by the in-focus control portion, is output as image data corresponding to the number of all pixels.

3. The photographing apparatus of claim 1, further comprising:

a switching portion selectively switching an output mode of the photographing portion between a first mode in which an image of the object is output as image data of all pixels and a second mode in which the image of the object is output as image data corresponding to less than all pixels;

a detection portion detecting a state of pressing the shutter button in two steps; and a determination portion determining whether the time interval between the shutter button pressed reaching a first step and the shutter button pressed reaching a second step is within a predetermined time, wherein, when the time interval is within the predetermined time, the second mode is switched to the first mode and simultaneously the drive portion and the photographing portion respectively initiate processing operations, and the photographing portion outputs the image of the object photographed again, and after the focus lens is maintained at the in-focus position, as image data corresponding to the number of all pixels.

4. The photographing apparatus of claim 1, further comprising:

a switching portion selectively switching an output mode of the photographing portion between a first mode in which an image of the object is output as image data corresponding to all pixels and a second mode in which the image of the object is output as image data corresponding to less than all pixels;

a detection portion detecting a state of pressing the shutter button in two steps; and a determination portion determining whether the time interval between the shutter button pressed to a first step and the shutter button pressed to a second step is within a predetermined time, wherein, when the time interval exceeds the predetermined time, the drive portion and the photographing portion maintained in the second mode respectively continue process operations until the focus lens is maintained at the in-focus position regardless of whether the shutter button reaches the second step pressing state, and, when the focus lens is maintained at the in-focus position and the shutter button reaches the second step pressing state, the switching portion switches the second mode to the first mode and simultaneously the photographing portion outputs the image of the object as image data corresponding to all pixels.

5. The photographing apparatus of claim 4, wherein, when the focus lens is maintained at the in-focus position and the shutter button is in the second step pressing state, the switching portion maintains the first mode and the photographing portion outputs the image of the object as image data corresponding to the number of all pixels.

6. The photographing apparatus of claim 1, wherein the in-focus position detection portion obtains an evaluation value according to a contrast component of the image of the object based on the image data sequentially output from the photographing portion, and the in-focus control portion records only the image data corresponding to an evaluation value over a predetermined reference among the evaluation values obtained for each image data.

7. A photographing method comprising:

driving a focus lens included in a photographing optical system in a focus adjustment direction when a shutter button is pressed and continuously and sequentially outputting images of an object formed on an image forming surface through the photographing optical system as the shutter button is pressed once, as image data corresponding to all pixels;

detecting an in-focus position of the focus lens based on the sequentially output image data;

driving the focus lens to be maintained at the in-focus position based on a result of the detection; and sequentially recording the image data output from the photographing portion during which the focus lens is driven and maintained at the in-focus position after the shutter button is pressed.

8. The method of claim 7, wherein, after the focus lens is maintained at the in-focus position based on a result of the detection, photographing the image of the object as image data of all pixels.

9. The method of claim 7, wherein, in the step of detecting the in-focus position of the focus lens, obtaining an evaluation value according to a contrast component of the image of the object based on the image data sequentially output in the driving of the focus lens included in a photographing optical system in a focus adjustment direction, and, in the step of sequentially recording of the image data output from the photographing portion during which the focus lens is maintained at the in-focus position after the shutter button is pressed, only the image data corresponding to an evaluation value over a predetermined reference among the evaluation values obtained for each image data.

* * * * *